(12) United States Patent
Daly

(10) Patent No.: US 6,411,740 B1
(45) Date of Patent: *Jun. 25, 2002

(54) METHOD FOR NON-UNIFORM QUANTIZATION IN A RESOLUTION HIERARCHY BY USE OF A NONLINEARITY

(75) Inventor: Scott J. Daly, Kalama, WA (US)

(73) Assignee: Sharp Laboratories of America, Incorporated, Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/218,937

(22) Filed: Dec. 22, 1998

Related U.S. Application Data

(60) Provisional application No. 60/107,106, filed on Nov. 4, 1998.

(51) Int. Cl.⁷ .............................. G06K 9/36; G06K 9/40
(52) U.S. Cl. ...................... 382/251; 382/240; 382/239; 382/274
(58) Field of Search ................................. 382/232, 240, 382/239, 233, 274, 251, 248, 252, 260; 375/240.11, 240.1, 240.19, 240.18, 240.01, 144; 348/397

(56) References Cited

U.S. PATENT DOCUMENTS

| | | | | |
|---|---|---|---|---|
| 4,268,861 A | * | 5/1981 | Schreiber et al. | 348/397 |
| 4,302,775 A | | 11/1981 | Widergren et al. | 375/240.06 |
| 4,774,574 A | * | 9/1988 | Daly et al. | 348/406.1 |
| 5,101,280 A | * | 3/1992 | Moronaga et al. | 358/426 |
| 5,113,256 A | | 5/1992 | Citta et al. | 348/384.1 |
| 5,121,216 A | | 6/1992 | Chen et al. | 358/261.3 |
| 5,313,298 A | | 5/1994 | Meeker | 375/240.01 |
| 5,426,512 A | | 6/1995 | Watson | 358/426 |
| 5,452,104 A | | 9/1995 | Lee | 358/433 |
| 5,629,780 A | | 5/1997 | Watson | 358/432 |
| 5,631,978 A | * | 5/1997 | Galand et al. | 382/240 |
| 5,682,442 A | * | 10/1997 | Johnston et al. | 382/239 |
| 5,960,123 A | * | 9/1999 | Ito | 382/240 |
| 6,137,904 A | * | 10/2000 | Lubin et al. | 382/160 |
| 6,160,846 A | * | 12/2000 | Chiang et al. | 375/240.05 |

OTHER PUBLICATIONS

"Wavelet and Human Visual Perception in Image Compression" M. G. Albanesi, Proceedings of ICPR '96, IEEE, 1996, pp. 859–863.*

"Threshold Selection for Wavelet Shrinkage of Noisy Data," D.L. Donoho et al., IEEE, 1994, pp. 24a–25a.*

Watson, A. B., Efficiency of a Model Human Image Code, *Journal of the Optical Society of America*, vol. 4, No. 12, Dec. 1987, pp. 2401–2417.

* cited by examiner

*Primary Examiner*—Wenpeng Chen
(74) *Attorney, Agent, or Firm*—Marger Johnson & McCollom, PC

(57) ABSTRACT

A method for compression and decompression of image data. The data is received as an initial image at an encoder. The encoder compresses the data by performing a spatial frequency decomposition on the image data, modifying selected frequency band images produced by the decomposition by applying a non-linear transformation, quantizing the results and compressing them into a bit stream. The data is then transmitted to a decoder that reverses the process.

10 Claims, 9 Drawing Sheets

METHOD FOR NON-UNIFORM QUANTIZATION IN A RESOLUTION HIERARCHY BY USE OF A NONLINEARITY

This application claims priority to U.S. Provisional Application No. 60/107,106, filed Nov. 4, 1998.

BACKGROUND OF THE INVENTION

1. Field of the Invention

This invention relates to image compression, and more particularly to methods of adaptive or nonlinear compression optimized for the visual system.

2. Background of the Invention

The most common method of optimizing compression for the visual system is to transform the amplitudes of the image to a domain, which is perceptually uniform. Since the visual system's gray scale behavior is approximately characterized by a cube-root front-end amplitude nonlinearity, the theory is to convert the image to an inverse domain, such as cubic, and then quantize. This technique forms part of nearly all video standards, with the exception that the power function of 3 is replaced by values around methods do this as a consequence of compressing images represented in the video standards. The advantage is using this approach is so substantial that it is used in almost every compression method.

The second most common method to visually optimize compression is by utilizing models of the visual system to weight the accuracy of the different spatial frequencies. This relies on the visual system's varying sensitivity to 2D spatial frequencies. Various levels of visual models include the visual system's low-pass characteristics at high spatial frequencies, its orientation dependence, and its bandpass nature at very low frequencies. The contrast sensitivity function (CSF) of the visual system describes the visual response to 2D spatial frequencies, and it is usually mapped to the compression transform domain, and then used to linearly quantize the transformed coefficients. This has been done for the discrete cosine transform (DCT), vector quantizers (VQ), and wavelet transforms.

As the visual angle of the displayed pixel gets smaller, such as by increasing the displayed resolution or by increasing the viewing distance, the performance of this technique increases, becoming quite substantial for photographic resolution applications. This technique does not provide as much advantage to lower resolution displays, such as NTSC or VGA resolutions, especially when viewed at working distances (usually 1.5 picture heights), as opposed to entertainment distances (>3 picture heights).

The third main area of visual optimization attempts to exploit the masking properties of the visual system, where visual sensitivity to distortions is reduced as the image content energy increases. This approach has advantages in that it can work in cases where the CSF does not provide much advantage. The most common of these cases is where the frequency sensitivity of the visual system does not change much over the digital frequencies present in an image. This corresponds to low resolution displays or close viewing distances. It also can help regulate bit-rate when entropy coders are used, or help keep a consistent image quality when rate control is used.

Early work in this area first tried scaling the overall quantization values as a function of local image variance usually with DCT blocks, but these have met with limited success because the DCT and block decompositions do not correspond well to the masking property of vision. Further, such adaptive methods require processing overhead to direct the decoder what quantizer was used to encode block. One method as disclosed in U.S. Pat. No. 4,774,574 combines notions from adaptive differential pulse code modulation with masking in the DCT domain to have an adaptive quantizer without any overhead. Unfortunately, the nature of the DCT and the zigzag coefficient ordering did not allow for accurate modeling of the masking effect. In spite of this, the use of visual masking to guide adaptive quantization results in bit-rate reductions of 5–25%, depending on the image content.

It is now known that the masking property of vision primarily occurs within spatial frequency channels that are each limited in radial frequency as well as orientation. The term channel refers to a collection of all mechanisms with the same spatial frequency. More recently, compression techniques that decompose an image into frequency bands analogous to the visual system frequency channels have been more amenable to use this vision property. The visual system is believed to decompose the image into localized mechanisms over spatial frequency and spatial location, and these mechanisms become less sensitive as their content is increased. This drop in sensitivity with the increase in content is what is referred to as the masking effect.

The masking effect makes it possible to quantize more coarsely as a function of the activity in that mechanism so that the visual masking effects are utilized by nonuniform quantization, as opposed to overtly adaptive techniques. Since these masking effects are approximately the same in each channel, once normalized, the same masking procedure could be used in each channel.

The Cortex transform decomposition set out in *Efficiency of a Model Human Image Code*, by Watson, (JOSA A V4, pp2401–2417), was designed to be as close as possible to the visual system's spatial frequency channels such that the transform coefficients were approximately equivalent to the visual mechanisms. One could then quantize each coefficient in direct accordance with the known masking functions of the visual system, resulting in adaptive quantization behavior without incurring any overhead. This is because the decoder would be designed to contain the masking function, and only one is needed since it can be applied equally to any coefficient.

A final area of optimization is in using the visual system's varying sensitivity to color distortions. However, most existing visual optimization strategies for color first extract the achromatic, or luminance, component from the color images.

In summary, then, a method is needed that performs compression with better visual optimization for a lower bit-rate than presently available. In addition, a need exists for the compression method to be less sensitive-to image content.

SUMMARY OF THE INVENTION

One embodiment of the invention is a method for image compression and decompression with high quality versus bit-rate. The method includes a compression process with the steps of spatial frequency decomposition, frequency band classification of the decomposed image, application of a sigmoid nonlinearity and uniform quantization. The data is then encoded and transmitted. The decompression process performs bit decoding and applies an inverse sigmoid nonlinearity. This data then undergoes a frequency band and spatial frequency recomposition to produce the full bandwidth image.

It is an advantage of the invention in that it improves the perceived image quality in applications where frequency-weighting techniques do not provide much gain, such as those with low display pixel resolution and those with close viewing distances.

It is a further advantage of the invention in that it makes the image quality less variable with changes in image content.

It is a further advantage of the invention in that it is adaptive, without adding processor overhead or image assessment computations.

It is a further advantage of the invention in that the sigmoid nonlinearity serves to distribute the quantization error more in accord with the thresholds of the visual system, with the net effect of achieving high quality with lower bit-rate.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
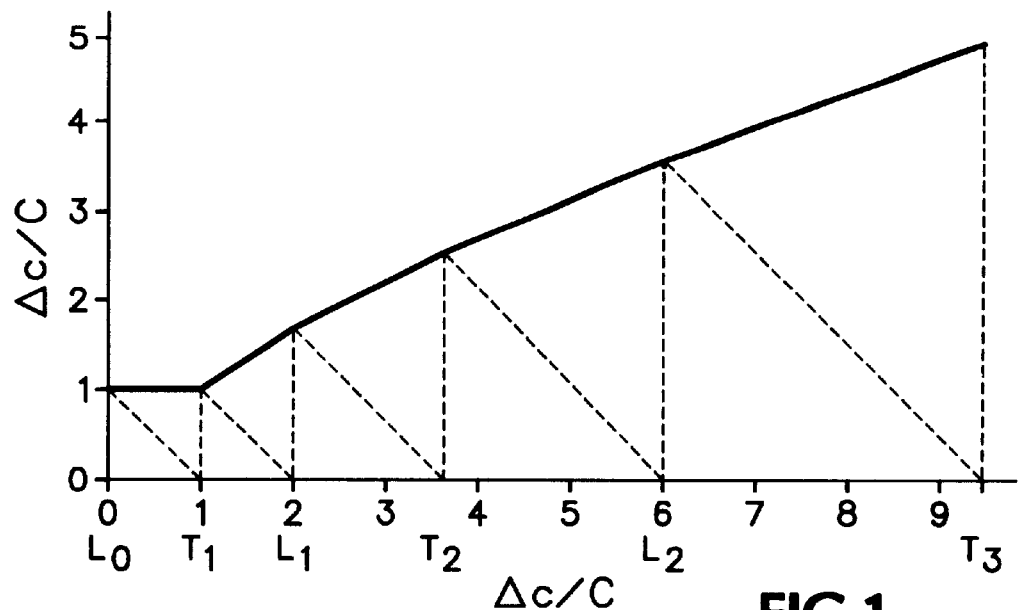
FIG. 1 shows graph of a prior art encoder quantization.

Most of the prior art builds on the Cortex Transform set out in *Efficiency of a Model Human Image Code*, by Watson, (JOSAA V4, pp2401–2417) where he decomposes an image into a pyramid structure with orientation decomposition as well as spatial frequency. Within this image pyramid, pixels become coefficients of the transform that can be used to reconstruct the image. Quantization of the coefficients is followed by entropy coding to provide for compression. The quantization is nonuniform and the effect is that as image energy in an oriented frequency band increases, more quantization distortion is allowed, in accordance with the masking properties of the visual system. The particular nonuniform quantization was implemented directly through a LUT. The quantization as a function of coefficient amplitude is shown below in FIG. 1, and is given by the equation [1], the function graphed in FIG. 1 is the quantization function Q given by the above equation $$Q = \begin{cases} g^{-1} C_{TO} & \text{if } C_M < C_{TO} \\ g^{-1} C_{TO} \left( \frac{C_M}{C_{TO}} \right)^S & \text{otherwise} \end{cases} \quad (1)$$

where Q is the quantization interval, g is the gain of the coefficient to display contrast, $C_{TO}$ is the visual contrast threshold for the band, $C_M$ is the contrast of the wavelet band coefficient to be quantized, and S is the masking slope, which is usually between 0.5 and 0.7. In the Figure the x-axis c/C is analogous to $C_M$, the quantization levels are $L_0$, L1, L2, etc, and the quantization intervals derive from the thresholds, $T_1$, $T_2$, $T_3$, etc. The function graphed in FIG. 1 is the quantization function Q given by the above equation.

Figure 2:
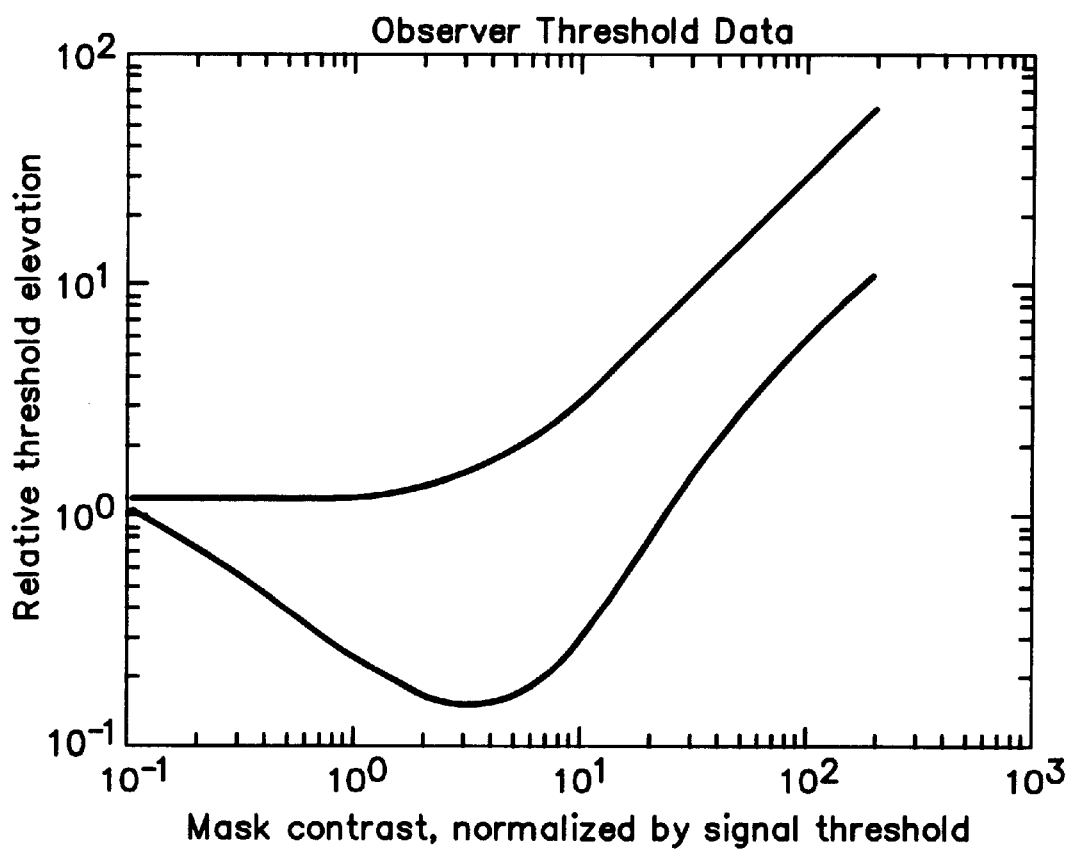
FIG. 2 shows a graphical comparison of threshold versus masking contrast psychophysical data.

The design of this quantizer is based on the threshold vs. masking contrast psychophysical data as shown in FIG. 2. These curves describe the elevation of threshold, which in the context of compression relates to the maximumu allowable distortion. Also note that the inverse of threshold is sensitivity, which relates to gain of the visual system. The data shows the visual system behavior for two types of masking patterns. One type of mask is noise, results of which are shown as the dashed line, and it is important because it has an entirely uncorrelated phase. This shape of this result occurs if the noise is white or narrow band. The other main type of mask is a sine wave, shown with a solid line in FIG. 1, which is entirely correlated in phase. At low mask contrasts, the threshold is the same as if it was presented on a uniform, zero-contrast field. This is true for both noise and sine masks. As the contrast increases for the noise mask, the threshold initially stays constant but then the slope increases until it reaches a constant slope in this log-log plot. The plot can be described by the two asymptotic regions: one between markers 10 and 12 with a zero slope for low contrast, and one between markers 12 and 14 with a slope near 1.0 for high noise contrast.

The data for sine masking is shown as the solid line and it is similar with the two asymptotic regions for low and very high contrasts, between the left axis and marker 16, and between markers 18 and 20, respectively. In addition there is a region between markers 16 and 18 where the threshold actually is reduced from that of the uniform field. This region indicates that masking is not occurring, but rather the opposite, where the background masking content actually makes the visual system more sensitive. This effect is referred to as facilitation, and the curve shape is referred to as the dipper effect. Actual images consist of regions that are various blends between these types of masks. One can see that the Watson plot of FIG. 1 has incorporated elements from both of these results in that he has a lower slope (0.7) to more closely match the sine mask, and the lack of a facilitation effect from the noise mask.

Further work in applying masking to compression was done by applying this approach to a Cartesian-separable wavelet transform, which is more efficient than the Cortex Transform but less accurate with respect to the visual system. In this area of the prior art, the nonlinearity prior to compression was suggested to be, $$Q_{\lambda\theta} = 2D_{\lambda\theta} \sqrt{1 + \sigma_{\lambda\theta}^2} \quad (2)$$

where $Q_{\lambda 0}$ is the quantization scale factor of a band for wavelength $\lambda$ and band $\theta$. The value $D_{\lambda\theta}$ is the visual threshold for that band. The variance, $\sigma_{\lambda\theta}^2$, is that of the band and possibly neighboring orientation bands. The effect of using this masking was never demonstrated in the paper, just suggested. This equation is cast in the form of the resulting quantization applied to a coefficient as a function of its variance (and possibly its neighbors in orientation). For the AC bands, a is proportional to contrast. The resulting quantization here is like FIG. 1, in that there is no dipper effect, but in this version the asymptotic power-function slope is 1.0, rather than 0.7.

Another approach is to implement the nonuniform quantization by applying a nonlinearity prior to a uniform quantizer. This will require a different nonlinearity from that used in FIG. 1. Such a nonlinearity would be derived from the integral of the threshold data.

Figure 3:
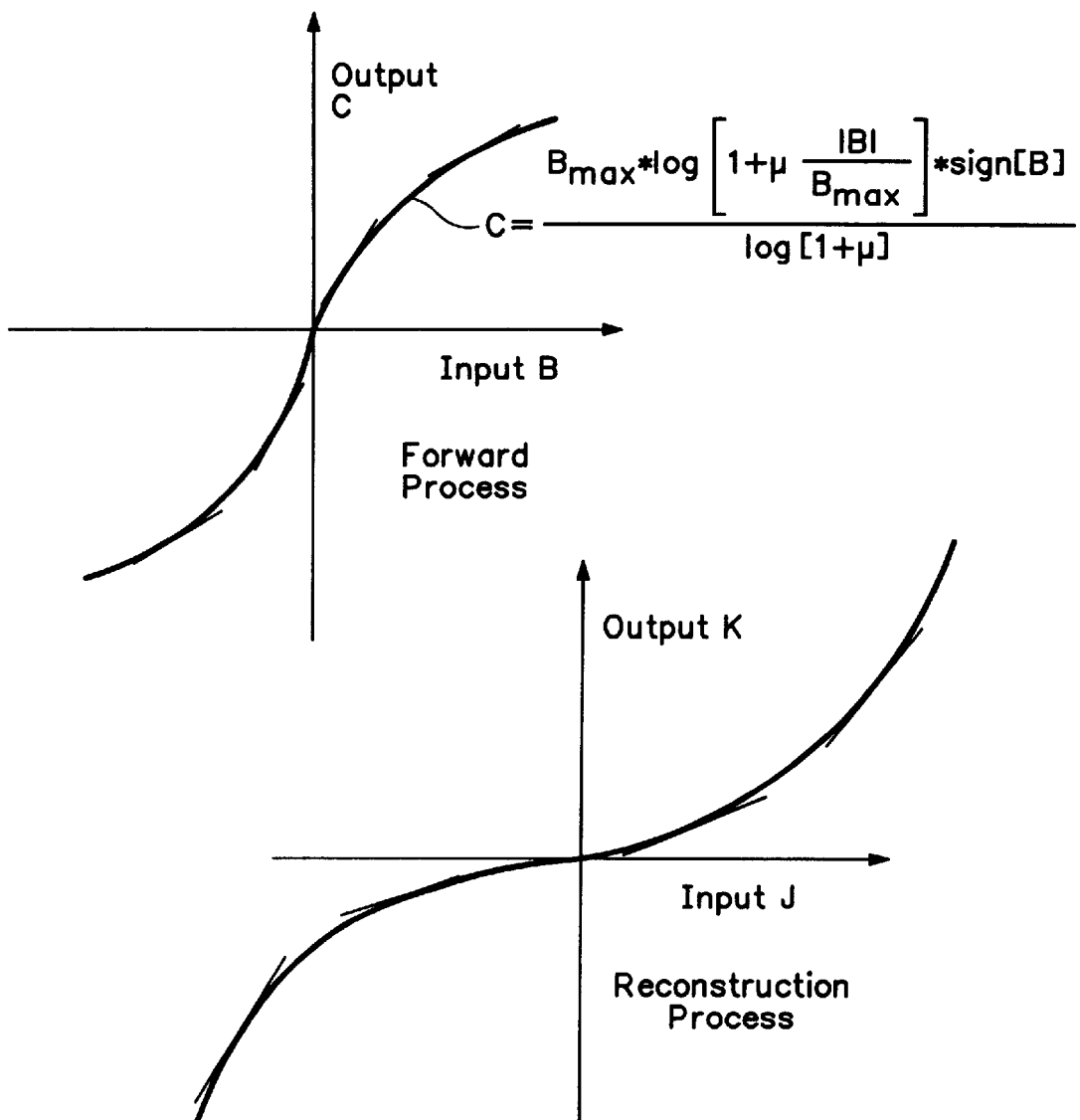
FIG. 3 shows graphs of a prior art encoder and decoder nonlinearity.

Discrete cosine transform (DCT) has been used extensively in the prior art. Examples of these patents are: U.S. Pat. No. 4,302,775, Compression Labs, Inc.; U.S. Pat. No. 4,774,574, Kodak; U.S. Pat. No. 5,101,280, Fuji Photo; U.S. Pat. No. 5,113,256, Zenith; U.S. Pat. No. 5,121,216, Bell Communications Research; U.S. Pat. No. 5,426,512, NASA; U.S. Pat. No. 5,452,104, Qualcomm, Inc.; and U.S. Pat. No. 5,629,780, NASA. Other techniques include using a nonuniform quantization similar to the techniques disclosed herein. An example of these techniques can be found in U.S. Pat. No. 5,313,298, Rubin, Bednarek and Associated, Inc. However, this uses a transform that has no inflection point, it uses a continuously decreasing slope, as can be seen in FIG. 3.

One aspect of the instant invention is to use a sigmoidal nonlinearity prior to a uniform quantizer within a compression system. One preferred embodiment is a compression system that uses a spatial frequency hierarchy similar to the known processing behavior of the visual system. Examples of these spatial frequency hierarchies include the Cortex transform decomposition, which is close to the visual system, and the Gabor transform, as well as the steerable pyramid. However, the most practical current transform that approximates the visual system is the wavelet pyramid implemented in 2D via Cartesian separability. Using a nonlinearity only for certain frequency bands of the frequency decomposition increases the robustness of the system.

For example, the method does not apply the nonlinearity when the band contains frequencies higher than a certain visual frequency, or when the band frequency is lower than a certain visual frequency. The band frequencies are converted to visual frequencies by including information about the expected viewing distance and display resolution. In addition, if a decomposition has a diagonal band containing orthogonal orientations such as in the diagonal band of Cartesian separable decompositions, application of the masking effect to the diagonal band can cause a problem with artifacts on diagonal edges. This occurs because the diagonal band of the Cartesian separable wavelet is least like the visual systems mechanisms and the orthogonal components within that band (45° and −45° orientations) do not mask each other as substantially as the components within the other bands do.

Figure 4:
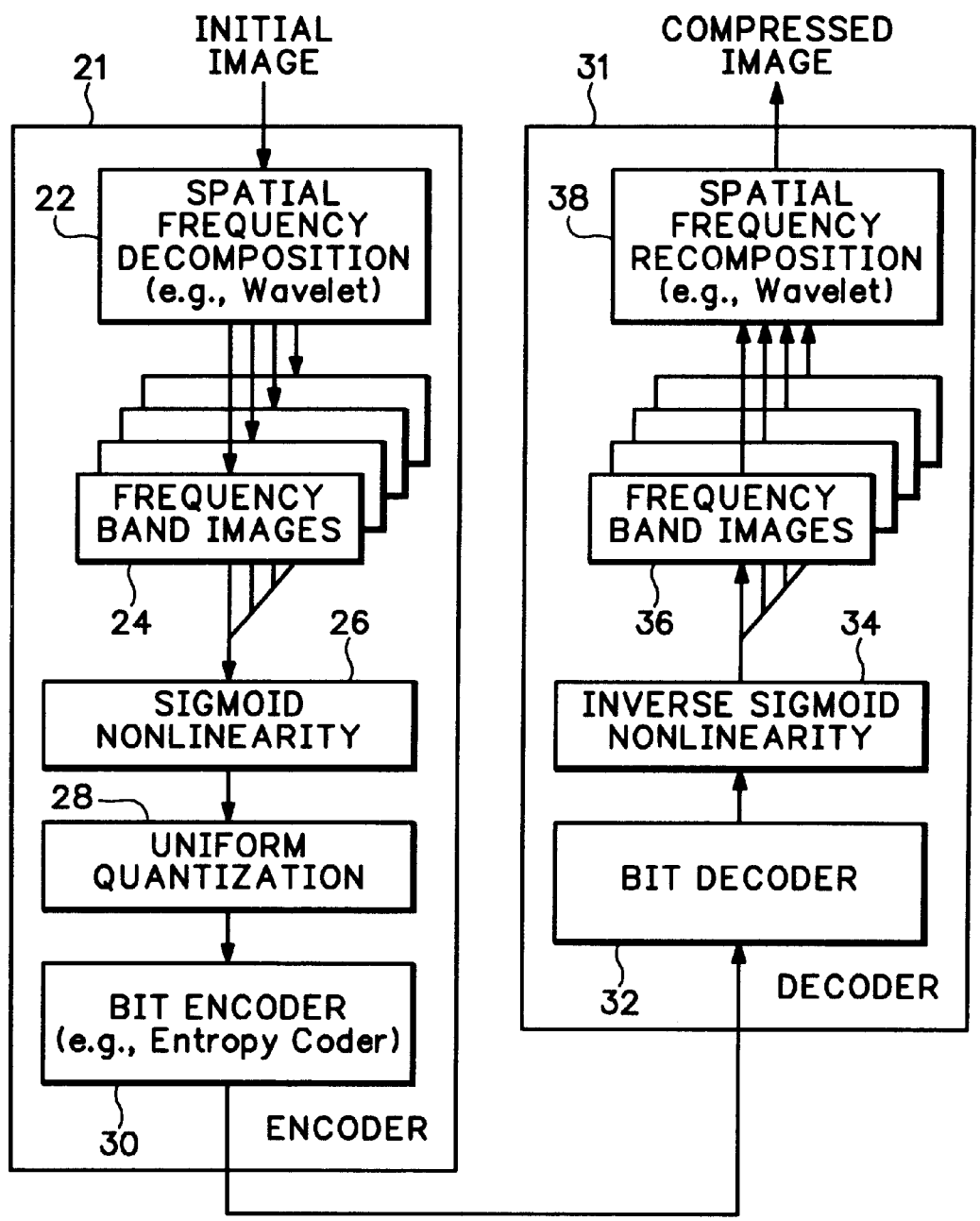
FIG. 4 shows a flowchart of one method for compression and decompression in accordance with the invention.

The block diagram for the system is shown in FIG. 4. An initial image is to be encoded by the system, which consists of an encoder 21 and decoder 31. The encoder consists of spatial frequency decomposition at 22, of which the Cortex transform, Steerable Pyramid, and Wavelet transforms are examples. It is also possible to use a DCT transform, but the results are inferior to those previously mentioned. These transforms convert the initial image into a series of spatial images with different frequency content, referred to as frequency band images at 24. Typically, these have a spatial size in proportion to the maximum frequency content.

Figure 5A:
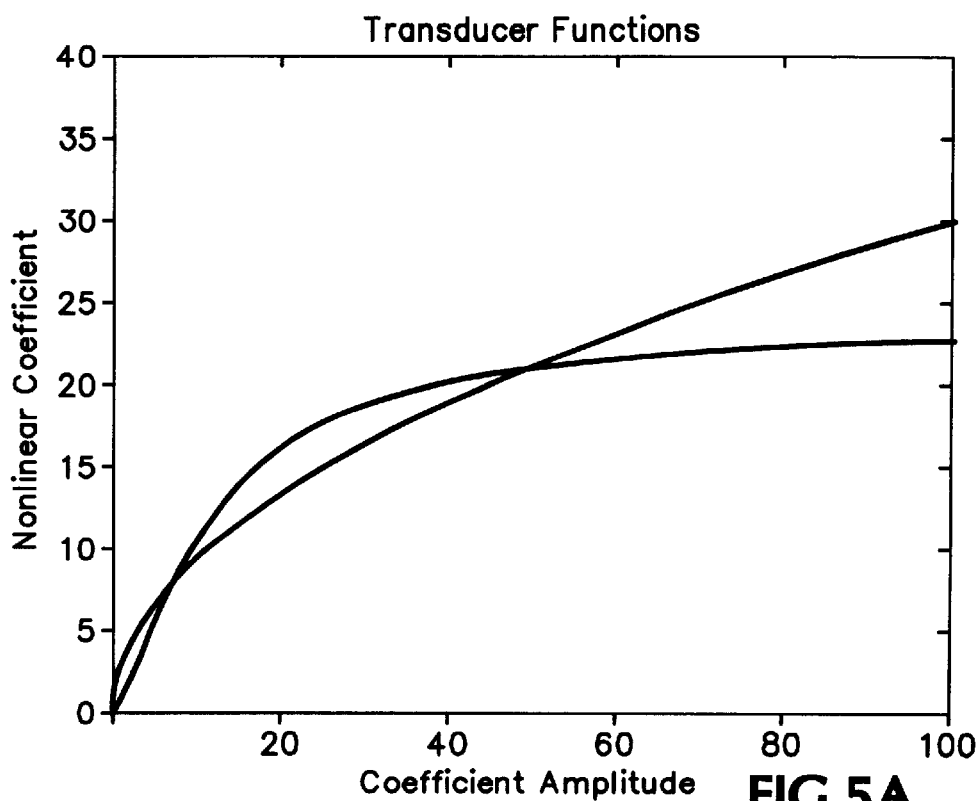
FIGS. 5A–5B show graphical views of nonlinearity of an encoder in accordance with this invention.
Figure 5B:
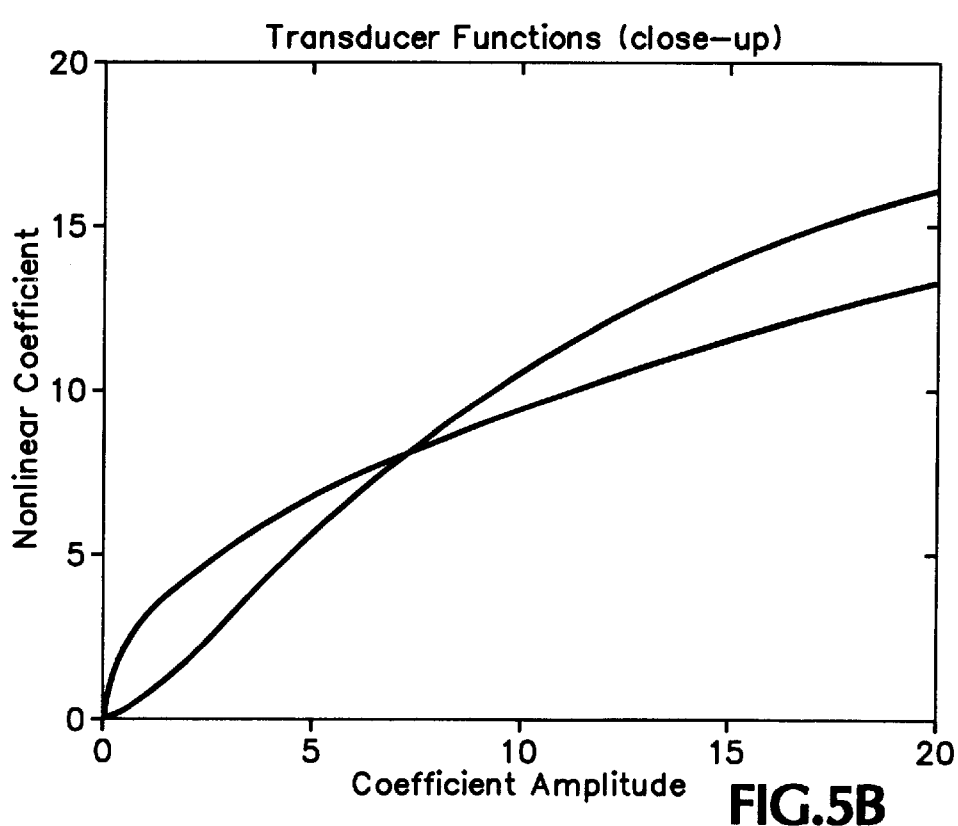

Each pixel of these images is referred to as a coefficient of the transform, and their amplitude describes the frequency content at their position in the image. These coefficients are then modified with a sigmoidal nonlinearity at 26, referred to as a transducer function in keeping with the terminology of visual science, which is shown in FIGS. 5A–B. The full view is shown in FIG. 5A and a close-up view for better comparison to the prior art approach of a power function is shown in FIG. 5B. In these figures the transducer function used is shown as a solid line, and the prior art power function, 0.5 is used here, is shown as a dashed line. Also, the negative coefficients are processed by the same nonlinearity by taking their absolute value, processing through this transducer function, and then reaffixing the negative sign. The equation for the transducer function we use is $$C_{out}(i,j,b) = \text{sgn}(C_m(i,j,b)) \cdot \zeta \cdot \tan h(\alpha \cdot \log |C_{in}(i,j,b)| + \beta) + \lambda \quad (3)$$

where $C_m(i,j,b)$ is the input coefficient amplitude, $C_{out}(i,j,b)$ is the output coefficient amplitude to be uniformly quantized. The parameters $\alpha$, $\beta$, $\zeta$, and $\lambda$ are for scaling the shape of the sigmoid, sgn is used to reaffix the sign after it passes through the nonlinearity, tanh is the hyperbolic tangent and the log function is to the base 10. The indices i, j, and b indicate the position and band of the coefficient. The transducer function is shown here in equation form but would most likely be implemented with a look-up-table (LUT).

The coefficients nonlinearly transformed by the transducer function are then uniformly quantized at 28. Scalar quantization is the preferred approach but other methods can be used as well. The output from the uniform quantizer is then encoded as a bit stream using entropy coding and sent to a channel at 30. The band images are generally scaled in a calibration step so the coeffcients are linearly scaled prior to their transform by the nonlinearity. This scaling can be band-dependent and may be done for rate control purposes, and for optimizing to the frequency characteristics of the visual system. These scalings will be described in more detail further on in the discussion.

Consequently, in FIGS. 5A–5B the x-axis should be regarded as relative amplitudes. In comparing the sigmoidal nonlinearity used in this invention with the prior art power function, it can be seen that the sigmoidal nonlinearity has an inflection point at marker 40 where the $2^{nd}$ derivative is zero. It has a region near zero containing an accelerating nonlinearity, and a region for higher coefficient amplitudes described as a compressive nonlinearity.

Higher slopes of these functions relate to less quantization error because the uniform quantization is applied to the y-axis, and the decoder applies the inverse function to this quantized value. For the power function, we see that less quantization error is allocated to the lower amplitude coefficients than the higher. While this is also generally the case in the sigmoidal nonlinearity, a major difference is that the most accuracy can be allocated to region slightly above zero, seen where the slope of the sigmoidal nonlinearity is higher than the power function nonlinearity. This is more in accord with visual data.

In terms of the effect in compression, the use of the power function will be limited because artifacts occur in this sensitive region slightly above zero. In order to maintain compression artifacts undetectable, either less of a power function effect (i.e., the power exponent must increase toward one) can be used, or the quantization on the y-axis must be reduced. Both of these will increase the bit-rate when compared to the sigmoid nonlinearity approach for a given image quality.

Figure 6A:
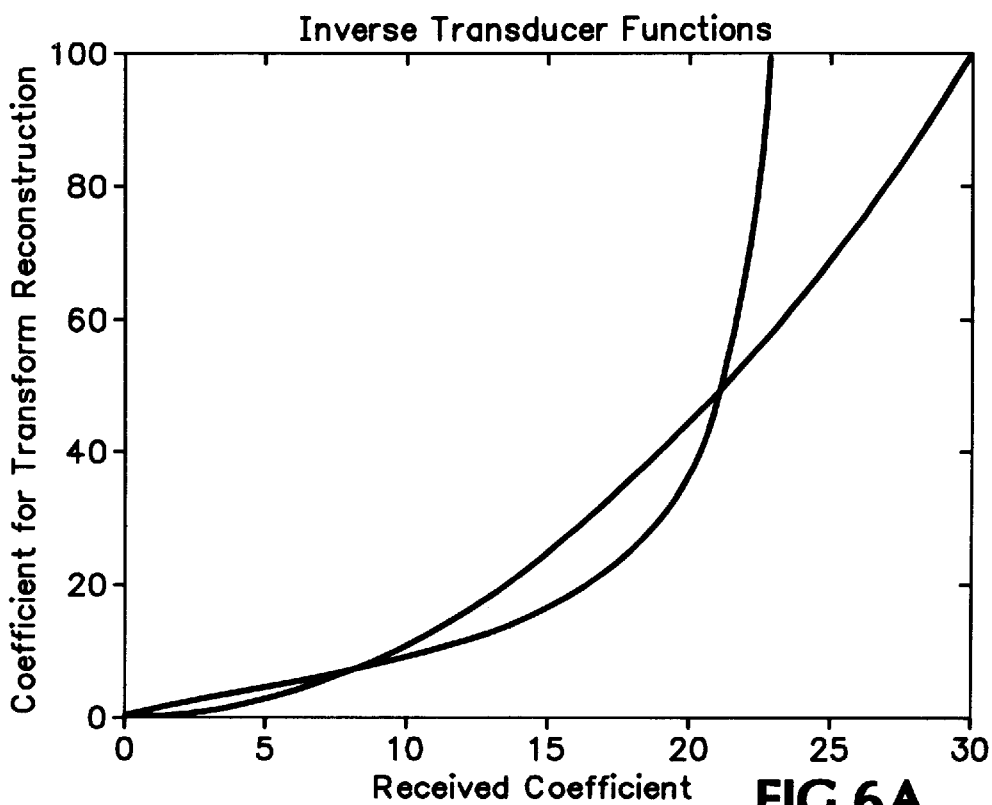
FIGS. 6A–6B show graphical views of nonlinearity of a decoder in accordance with this invention.
Figure 6B:
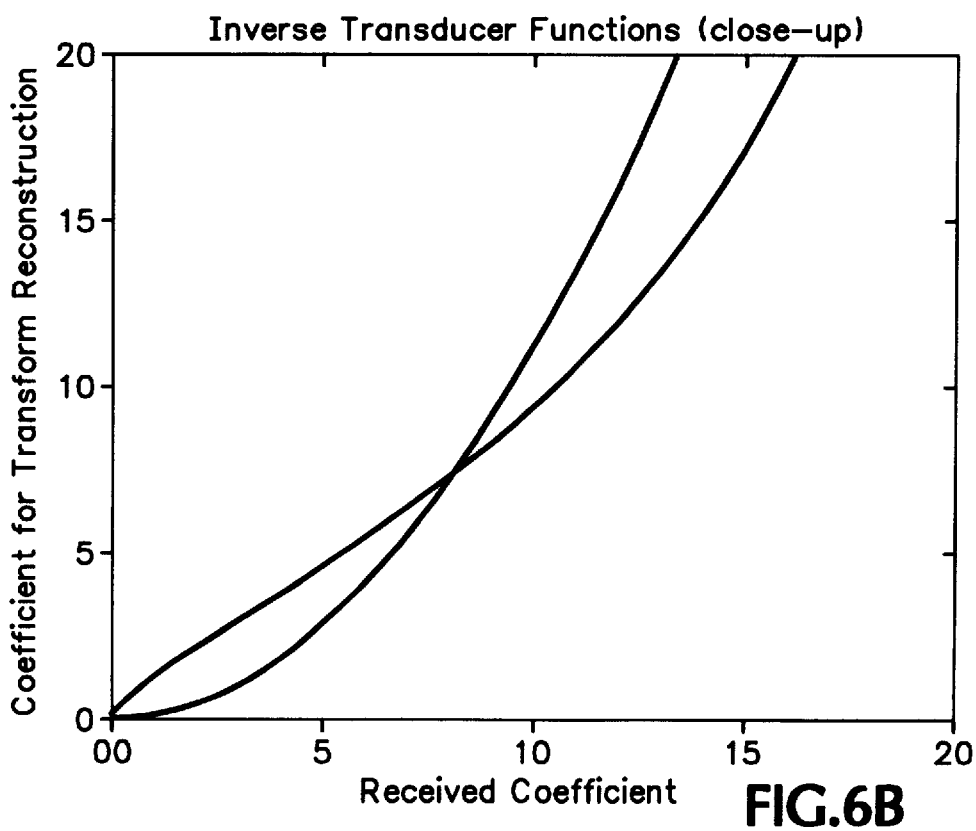

The encoded bitstream is then input to the decoder 31 in FIG. 4. The first step to convert the bit stream back to coefficients at 32. This bitstream decoder also generates the position of the coefficient in the transform, which essentially describes its spatial position and band image. The decoder nonlinearity is applied at 34 to the coefficient's absolute value, and the sign is saved and reaffixed after this nonlinearity. The decoder's nonlinearity is the inverse of the encoder nonlinearity, and is easily derived from equation 3. The decoder nonlinearity, or inverse transducer function, is shown in FIGS. 6A–6B, where FIG. 6A shows the view over a full range of encoded coeffcients, and FIG. 6B shows a close-up for comparison to the power function approach. The power function is again shown as a dashed line.

Figure 7A:
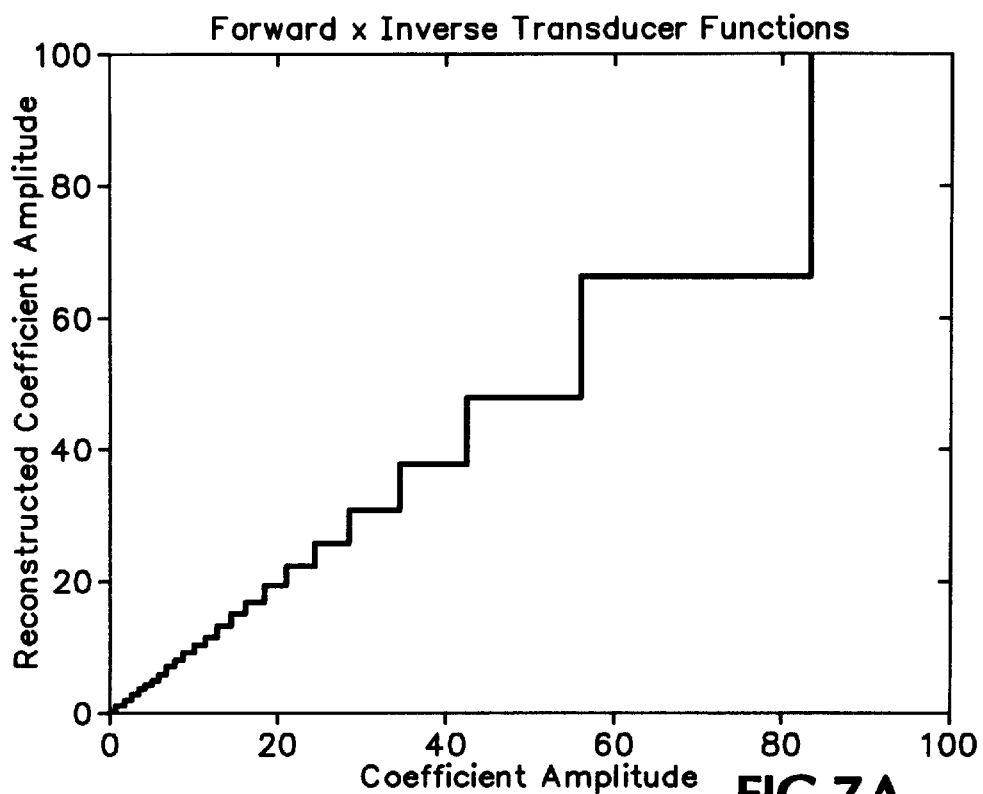
FIGS. 7A–7B show cascaded encoder/decoder nonlinearities with quantization in accordance with this invention.
Figure 7B:
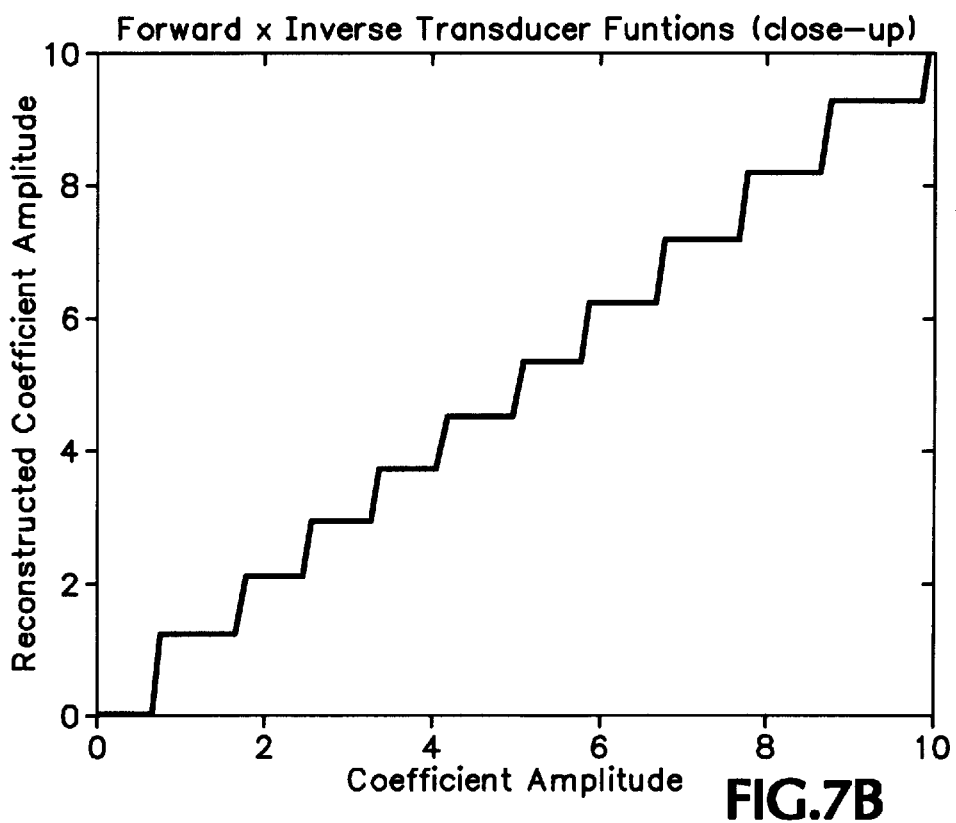

If not for the quantization in the encoder, the system transform characteristic would be the cascade of the encoder and decoder nonlinearities ignoring losses in the transform decomposition and recomposition. This would be the unity transfer function. However, quantization is used as necessary for converting the coefficient values to bits, and as a way on reducing entropy. The cascade effect for the range of coeffcients is shown in FIGS. 7A–7B, where FIG. 7A shows the full range and 7B shows a close-up. Note that the step size varies as a function of coefficient amplitude. Beginning at values near zero, the first effect is that the step size reduces, resulting in more accuracy. Then after a value near 4, the step sizes increase. As stated previously, these x-axis amplitudes are relative.

Figure 8:
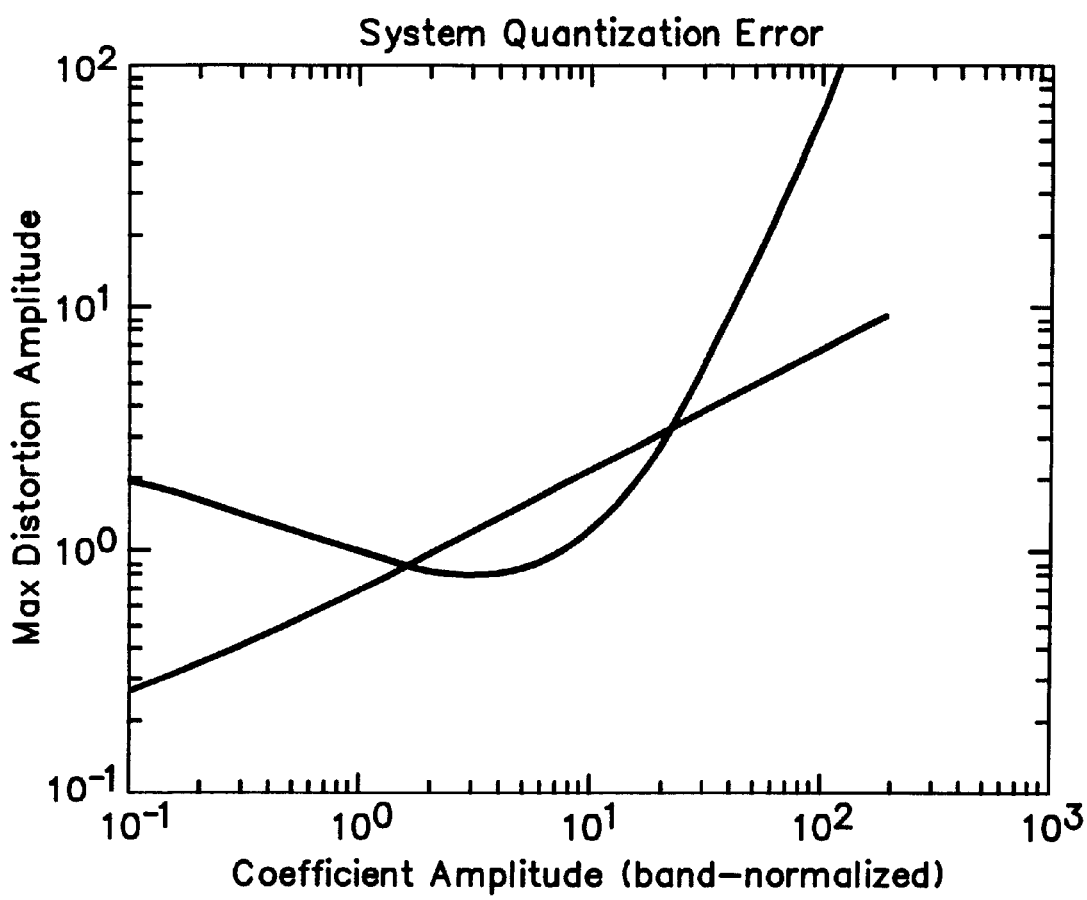
FIG. 8 shows a graphical representation of error size as a function of signal amplitude in systems incorporating this invention.

These step size changes are designed to be in accordance with the ability to see contrast increments and decrements of a spatial frequency, when occurring on a signal of the same frequency. In general, the resulting step size as a function of coefficient amplitude is given by the derivative of the transducer function at the encoder. This is shown in FIG. 8 for the transducer function of this invention shown as a solid line, and the result for the prior art method of using 3 power function shown as dashed. The actual quantization levels depend on the scaling due to rate control, so this distortion is only done in a relative sense. Note that the power function shown in FIG. 8 is continuous, while the actual implementation as shown in FIG. 1 was clipped at values below 1. This curve is compared to the psychophysical data in FIG. 2, of which the system is using as a guide for distributing distortion.

Finally, referring back to the block diagram of FIG. 4, the coefficients that are altered by the inverse transducer nonlinearity are ordered into the band images at 36. These will be transformed via the inverse transform used in the encoder, as the compressed mage is recomposed into a full bandwidth image at 38.

Other modifications and embodiments may be preferred. The first of these is that the nonlinearity is not employed on specific bands. There are bands eliminated based on their location in the pyramid. For example, this nonlinearity should never be employed on the baseband of the pyramid, that is, the band that includes the DC value of the image. There are also criteria based on what visual frequencies are contained in the band.

Figure 9:
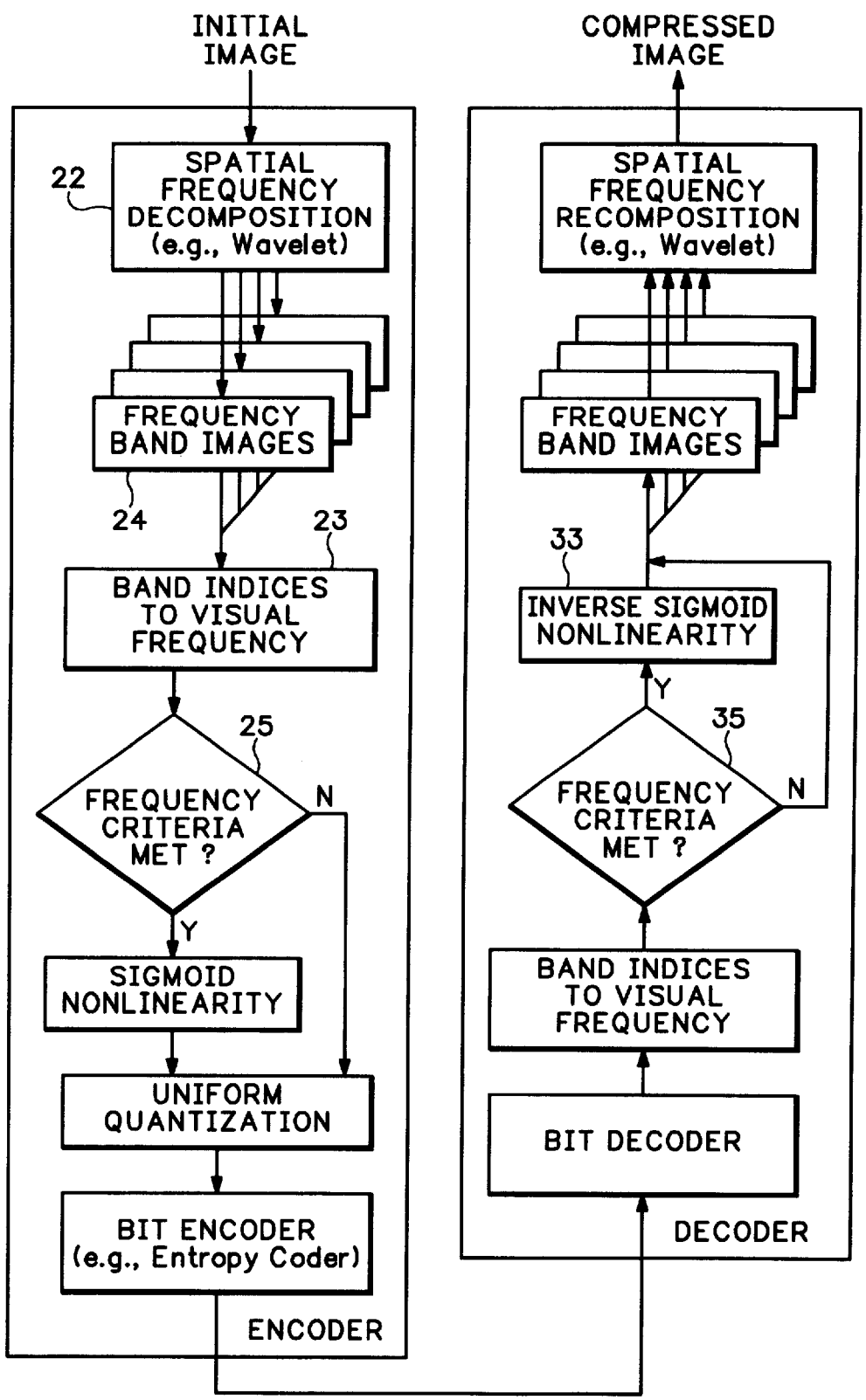
FIG. 9 shows a flowchart of one method of compression and decompression in accordance with this invention that includes band-selectivity.

These criteria are to be used in cases where the viewing distance and display resolution are known or assumed to be within given ranges, such as when the CSF is used for frequency weighting. In this case, we do not use the nonlinearity for bands with frequencies lower than approximately 0.5 cycles/degree of visual angle, or for frequencies greater than 20 cycles/degree. These values can be altered at the discretion of the implementers to match various image source power spectra expectations. This band-selective option is shown in FIG. 9. After the frequency band images are produced at 24, the bands are indexed to visual frequency at 23, and a selection is made at 25. Similar reverse steps are performed at 35 and 33 at the decoder.

Another specific embodiment is to bypass the nonlinearity for the diagonal bands of Cartesian separable decompositions. This is because the diagonal band contains frequencies near both 45° and −45°, which have only slight masking effect on each other. The use of the sigmoid nonlinearity in increasing the quantization error would cause distortions at both of these orientations, even if the local image region only contains one. If so, the distortion component with an orientation not present in the local region would not be masked as expected. This orientation selectivity is just another form of frequency selection, and can be incorporated within the block diagram of FIG. 9.

Another specific embodiment is the use of the wavelet transform, implemented in 2D by Cartesian separability for the decomposition shown in FIGS. 4 and 9 at 22.

Two final specific embodiments relate to how features of frequency weighting and rate control are combined with the transducer nonlinearity. Frequency weighting has been previously described, and generally the CSF of the visual system as well as the display MTF are used to weight the different frequency bands. The frequency weighting for these purposes should be applied prior to the nonlinearity at the encoder, as shown at 27 and the inverse at 37, in FIG. 10. This ensures calibration of the transducer function, so that the facilitation region of nonuniform quantization corresponds to the facilitation region of the observer considering the distortions being rendered as physical contrasts.

Figure 10:
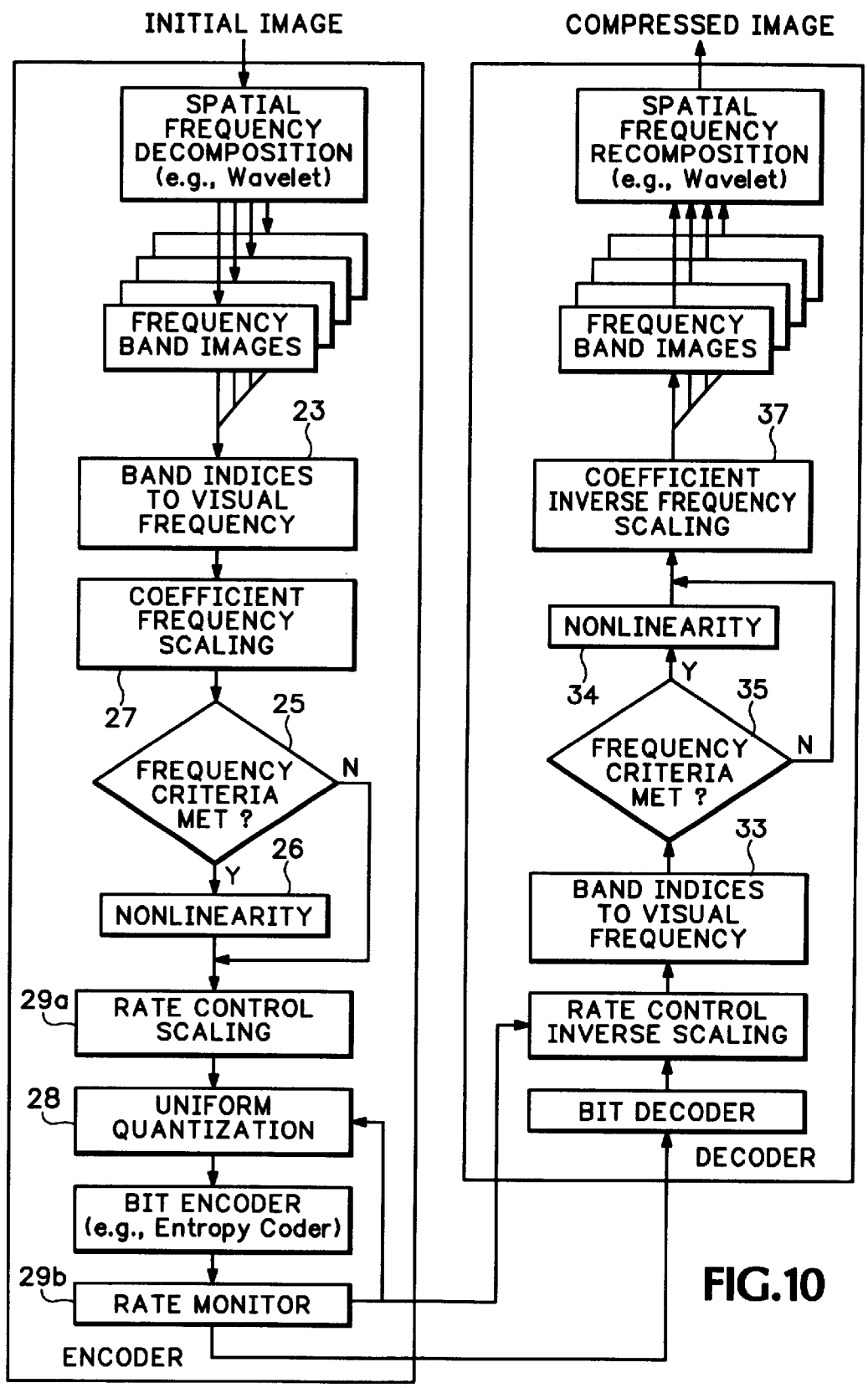
FIG. 10 shows a flowchart of one method of compression and decompression in accordance with this invention that includes frequency weighting and rate control scaling.

Rate control, however, is best applied after the nonlinearity in the encoder such as that shown at 29a and 29b in FIG. 10. This is because varying levels of available rate will change whether the distortion can be kept below visual detectability, or the various levels of distortion visible above threshold. This is one of the key attributes of rate control. The available bits in the rate control, however, have no effect on the relationship between the coefficient amplitudes and their associated level of masking via display to the observer. This can be made clear by considering the decoder, and observing that the coeffcients input to the recomposition step are the ones that relate to physical contrasts as displayed. In order to ensure that the transducer function matches up with the visual system's masking characteristics, the inverse nonlinearity must have no other scaling than the visual frequency weighting between it and the coeffcients input to the recomposition. With this perspective, it can be noted that the frequency weighting acts as a calibration step between coefficient and visual threshold as a function of frequency. In the decoder, the order of the inverse scaling for the frequency weighting and the rate control are reversed, as shown in FIG. 10.

Thus, although there has been described to this point a particular embodiment for a method and structure for visually-optimized compression, it is not intended that such specific references be considered as limitations upon the scope of this invention except in-so-far as set forth in the following claims.

What is claimed is:

1. A method for compressing and decompressing image information, comprising the steps of:
    a) receiving initial image data at an encoder;
    b) performing a spatial frequency decomposition upon said image data, thereby producing frequency band images having positive and negative coefficients;
    c) modifying selected ones of said frequency band images, wherein modification is performed with a nonlinear function, wherein the nonlinear function has a sigmoidal shape with respect to the positive and the negative coefficients, thereby producing non-linearly transformed coefficients;

d) performing quantization upon said non-linearly transformed coefficients into a compressed bit stream;

e) receiving said compressed bit stream at a decoder, thereby producing decompressed non-linearly transformed coefficients;

f) decoding the decompressed non-linearly transformed coefficients by adjusting them with the inverse of the sigmoidal nonlinear function, thereby producing decoded and adjusted coefficients;

g) inverting the decoded non-linearly transformed coefficients back to the spatial domain using these decoded and adjusted coefficients, thereby producing a full-bandwidth, decompressed image.

2. The method as claimed in claim 1, wherein the nonlinear function is applied to all frequency bands of a hierarchical image transform.

3. The method as claimed in claim 1, wherein said selected ones are selected to be horizontal and vertical frequency bands.

4. The method as claimed in claim 1, wherein selection of frequency bands is based upon mapping a visual model to digital frequencies of a hierarchical transform.

5. The method as claimed in claim 1, where the sigmoidal nonlinearity is based on the human visual system characteristics for sensitivity to sine waves as a function of background contrast.

6. The method as claimed in claim 1, wherein said spatial frequency decomposition is a Cartesian separable wavelet pyramid.

7. The method as claimed in claim 6, wherein one of a zero frequency, or highest level, of said pyramid is not included in said selected ones of said frequency band images.

8. The method as claimed in claim 1, wherein band-specific visual frequency scaling is applied before said modifying step, and band-independent rate control scaling is applied after said modifying step.

9. The method as claimed in claim 1, wherein band-independent rate control scaling is applied before said inverting step, and band-specific visual frequency scaling is applied after said inverting step.

10. A method for compressing and decompressing image information, comprising the steps of:

a) receiving initial image data at an encoder;

b) performing a spatial frequency decomposition upon said image data, thereby producing frequency band images having both positive and negative coefficients;

c) modifying selected ones of said frequency band images, wherein modification is performed with a nonlinear function applied to the absolute value of coefficients of said selected ones of said frequency band images, thereby producing non-linearly transformed coefficients, wherein the nonlinear function has a sigmoidal shape with respect to the positive and the negative coefficients;

d) performing quantization upon said non-linearly transformed coefficients into a compressed bit stream;

e) receiving said compressed bit stream at a decoder, thereby producing decompressed non-linearly transformed coefficients;

f) decoding the non-linearly transformed coefficients by adjusting the absolute value of the non-linearly transformed coefficients with the inverse of the nonlinear function;

g) inverting the decoded non-linearly transformed coefficients back to the spatial domain using these decoded and adjusted coefficients, thereby producing a full-bandwidth, decompressed image.

* * * * *

UNITED STATES PATENT AND TRADEMARK OFFICE
CERTIFICATE OF CORRECTION

PATENT NO. : 6,411,740 B1
DATED : June 25, 2002
INVENTOR(S) : Daly

It is certified that error appears in the above-identified patent and that said Letters Patent is hereby corrected as shown below:

Column 1,
Line 23, "values around methods" should read -- values around 2.2; this domain is generally referred to as gamma-corrected. Most compression methods --.

Column 2,
Line 53, "less sensitive-to image" should read -- less sensitive to image --.

Column 3,
Line 65, "equation [1], the function graphed in FIG. 1 is the quantization function Q given by the above equation" should read -- equation [1], --.

Column 4,
Line 60, "$Q_{\lambda\theta} = 2D_{\lambda\theta} \quad \sqrt{1 + \sigma^2_{\lambda\theta}}$" should read -- "$Q_{\lambda\theta} = 2D_{\lambda\theta} \quad \sqrt{1 + \sigma_{\lambda\theta}^2}$ --.
Line 64, "where $Q_{\lambda o}$ is" should read -- where $Q_{\lambda\theta}$ is --.

Column 5,
Line 5, "for AC bands, a is" should read -- For AC bands, $\sigma$ is --.

Column 6,
Line 15, in the formula "...$\xi \cdot \tan h(\alpha \times \log |$ ..." should read -- ...$\xi \cdot \tanh(\alpha \cdot \log |$ ... --.
Line 67, "the first step to convert" should read -- the first step is to convert --.

Signed and Sealed this

Seventeenth Day of February, 2004

JON W. DUDAS
*Acting Director of the United States Patent and Trademark Office*